Aug. 23, 1927.

W. C. DAWES 1,640,311

SURGICAL INSTRUMENT

Filed Jan. 13, 1925

Inventor
W. C. Dawes
By Richard B. Oliver,
Attorney

Witnesses

Patented Aug. 23, 1927.

1,640,311

UNITED STATES PATENT OFFICE.

WILLARD C. DAWES, OF BOZEMAN, MONTANA.

SURGICAL INSTRUMENT.

Application filed January 13, 1925. Serial No. 2,225.

This invention relates to surgical instruments.

An important object of the invention is to provide an instrument which will hasten and materially assist in child birth.

A further object of the invention is the provision of an instrument which will obviate any injurious effect upon the mother.

A still further object of the invention is the provision of an instrument of this character which is compact, strong and extremely efficient for the purpose intended.

Other objects and advantages of this invention will be apparent during the course of the following description.

In the accompanying drawings forming a part of this specification and in which like numerals are employed to designate like parts throughout the same:

Figure 1:
Figure 1 is a side elevation showing my improved invention.
Figure 2:
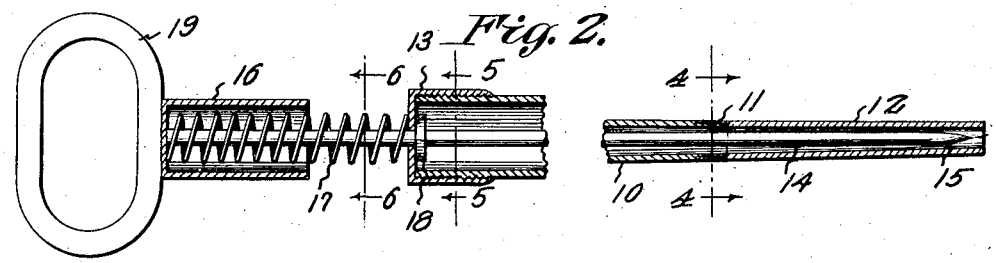
Figure 2 is an enlarged longitudinal sectional view taken thru the center of the device.
Figure 3:
Figure 3 is an enlarged elevation showing the extremity of the device in open position.
Figure 4:
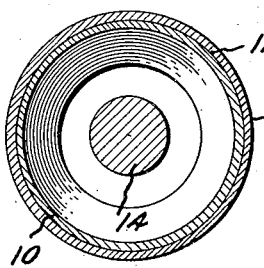
Figure 4 is a transverse sectional view taken on the line 4—4 of Figure 2.
Figure 5:
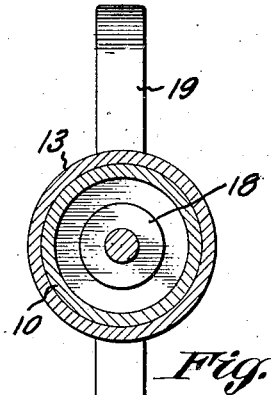
Figure 5 is a similar view taken on the line 5—5 of Figure 2.
Figure 6:
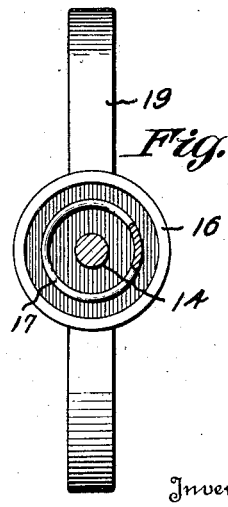
Figure 6 is a similar view taken on the line 6—6 of Figure 2.

In the drawings, wherein for the purpose of illustration is shown the preferred embodiment of my invention, the numeral 10 generally indicates a relatively long slender tubular casing member, preferably frusto-conical in form. The smaller extremity of the casing 10 is provided with a reduced projection or nipple 11. the same being externally screw threaded and adapted to engage suitable threads formed in one extremity of a substantially smaller casing or tip member 12. This tip is provided primarily for convenient cleaning and is adapted to snugly fit the extremity of the casing 10 and form a continuation thereof, the connection between the tip and the casing being securely made in order to provide a smooth surface. The larger extremity of the casing 10 is also provided with external screw threads for the purpose of receiving thereon a cap member 13, this cap being provided with internal screw threads in order to engage the threads formed on the casing. The cap substantially encloses one extremity of the casing, with the exception of a comparatively small opening formed in the center thereof, the purpose of which will be hereinafter described.

A comparatively long cylindrical rod or needle 14 is movably mounted within the casing 10, the diameter of the rod being slightly smaller than the diameter of the opening formed in the cap 13, permitting the rod to readily reciprocate therethrough. One extremity of this rod is tapered to a fine or needle point as shown at 15, this end of the rod being normally enclosed by the small end of the casing or tip 12. The opposite extremity of the rod 14 is welded or otherwise secured to the enclosed extremity of a sleeve 16, this sleeve partially enclosing one extremity of the rod and adapted to provide a protector.

As it is desirable to cause the pointed extremity of the rod to be normally disposed within the casing, a coiled spring 17 is positioned about one extremity of the rod, between the sleeve and closure cap, the position of the spring causing the rod to move thru the casing, this movement being restricted by a collar 18 secured to the rod by a cotter pin or any suitable manner. In order to permit convenient actuation of the rod within the casing, I provide a continuous handle 19, substantially oval in form adapted to permit well controlled movement thereof.

In use, the device is inserted into the vagina in the closed position, as shown in Fig. 1, the vagina being spread by the fingers for its reception. When the membranes are distended by the labor pains, the rod 14 is moved forward by means of the handle, the pointed extremity passing thru the end of the casing and causing the membranes to be punctured. The instrument is particularly constructed to enable physicians to perform this operation conveniently and safely. It is common practice to employ an instrument as the mouse tooth forceps for this purpose, but, as is well known, these forceps perform the operation with great difficulty and often cause pinching of the womb, which great care must be taken to avoid.

It is to be understood that the form of my invention herewith shown and described is to be taken as the preferred example of the same, and that various changes as to the shape, size and arrangements of parts may be resorted to without departing from the spirit of the invention or the scope of the subjoined claims.

Having thus described my invention, I claim:

1. A surgical instrument comprising in combination, a rod tapered to a fine point at one extremity, a tapered casing enclosing the greater portion of the rod and normally the pointed extremity thereof, a cap mounted upon one extremity of the casing, a spring member mounted upon the rod at the end opposite the pointed extremity and adapted to normally force the pointed extremity to a position within the casing, a sleeve member secured to the same extremity of the rod adapted to enclose a portion of the spring, and a handle secured to the sleeve adapted to permit operation of the rod through the casing.

2. An instrument of the character described, comprising an elongated membrane penetrating needle, an elongated tubular housing closed at one end and encasing the major portion of the needle and normally including the point thereof, the other end of said needle projecting through the closed end, a handle ring on said other end of the needle, a spring element between the closed end of the housing and said ring, and acting to normally retract the needle point into the casing, means carried by the ring for limiting the movement of the needle in one direction, and a stop carried by the needle for limiting the movement of the needle under action of said spring.

In testimony whereof I affix my signature.

WILLARD C. DAWES.